(12) United States Patent
Ekberg

(10) Patent No.: US 7,379,779 B2
(45) Date of Patent: May 27, 2008

(54) METHOD AND SYSTEM FOR MANUFACTURING

(76) Inventor: Gregg O Ekberg, 16360 Los Gatos Almaden Rd., Los Gatos, CA (US) 95032

( * ) Notice: Subject to any disclaimer, the term of this patent is extended or adjusted under 35 U.S.C. 154(b) by 136 days.

(21) Appl. No.: 11/096,108

(22) Filed: Mar. 31, 2005

(65) Prior Publication Data

US 2005/0222701 A1    Oct. 6, 2005

Related U.S. Application Data

(60) Provisional application No. 60/558,269, filed on Mar. 31, 2004.

(51) Int. Cl.
*G06F 19/00* (2006.01)
*G06F 17/50* (2006.01)

(52) U.S. Cl. .......................... 700/95; 705/29

(58) Field of Classification Search ............. 700/95–97, 700/99–107, 117, 121, 213, 214, 220, 231–233; 705/8, 26, 28, 29
See application file for complete search history.

(56) References Cited

U.S. PATENT DOCUMENTS

| | | | | |
|---|---|---|---|---|
| 5,089,970 A | * | 2/1992 | Lee et al. ..................... | 700/96 |
| 5,463,555 A | * | 10/1995 | Ward et al. .................... | 700/96 |
| 5,774,875 A | * | 6/1998 | Medeiros et al. ............. | 705/28 |
| 5,777,876 A | | 7/1998 | Beauchesne ........... | 364/468.01 |
| 5,974,004 A | * | 10/1999 | Dockes et al. .............. | 715/727 |
| 6,141,598 A | * | 10/2000 | Nam ........................... | 700/95 |
| 6,304,795 B1 | | 10/2001 | Reist .......................... | 700/219 |
| 6,345,259 B1 | | 2/2002 | Sandoval ....................... | 705/7 |
| 6,477,660 B1 | * | 11/2002 | Sohner .......................... | 714/1 |
| 6,748,286 B1 | | 6/2004 | Losch .......................... | 700/97 |
| 2003/0171841 A1 | | 9/2003 | Porter et al. ................ | 700/179 |
| 2004/0153200 A1 | | 8/2004 | Landers et al. ............. | 700/182 |
| 2005/0222701 A1 | * | 10/2005 | Ekberg ....................... | 700/107 |

* cited by examiner

*Primary Examiner*—Thomas K Pham
(74) *Attorney, Agent, or Firm*—Howard & Howard Attorneys, P.C.

(57) ABSTRACT

A method and system for manufacturing an object includes connecting a transportable memory to one of the materials needed to manufacture the object. The transportable memory stores identification data, computer programs and/or commands needed to manufacture the object, a bill of materials needed to manufacture the object, and/or identities of machines necessary to manufacture the object. The transportable memory and the material move to a machine in unison. The transportable memory communicates the necessary information for the proper computer program and/or command to operate the machine.

21 Claims, 3 Drawing Sheets

METHOD AND SYSTEM FOR MANUFACTURING

CROSS REFERENCE TO RELATED APPLICATION

This application claims the benefit of U.S. Provisional Application Ser. No. 60/558,269 filed Mar. 31, 2004, which is hereby incorporated by reference.

BACKGROUND OF THE INVENTION

1. Field of the Invention

The subject invention relates to manufacturing systems and related manufacturing methods.

2. Description of the Prior Art

Manufacturing machines have long been controlled by processors. Typically, these processors, and their related memory storage, contain one or more computer programs to control the operation of the machine. During "re-tooling" for a new product (or object), the processor must be reprogrammed to accommodate the new product. This reprogramming results in significant downtime and an increased risk of malfunction in future operations. Furthermore, the memory storage may be limited, thus limiting the variety of objects that the machine can manufacture.

Manufacturing machines are typically integrated into a broader manufacturing system. One example of such a system and a related method is disclosed in U.S. Pat. No. 6,345,259 (the '259 patent) to Sandoval. The '259 patent discloses a method and system in which work orders to manufacture objects are received and stored in a database. Based on the work order, setpoints, including manufacturing process settings, are generated. The setpoints are then provided to a computerized manufacturing system, and therefore to the manufacturing machines, for manufacturing the objects. The system and method of the '259 patent do not provide for nor allow for the manufacture of a wide variety of objects.

There remains an opportunity to provide a system and method of manufacturing an object having greater flexibility in operating machines to allow for a wider variety of customized objects to be manufactured.

SUMMARY OF THE INVENTION AND ADVANTAGES

The subject invention provides a method for manufacturing an object. The method includes the step of preparing a bill of materials for manufacturing the object from one of the materials listed. The method also includes the step of preparing a list of manufacturing operations necessary to manufacture the object. The method continues by associating a computer program operable on a machine with each manufacturing operation. Next, the method progresses by storing each computer program in a transportable memory. The method also includes the step of selecting one of the materials listed on the bill of materials necessary to manufacture the object. A link is established between the transportable memory and the selected material so that the transportable memory moves with the selected material. The method continues by moving the selected material and transportable memory to a first machine where the computer program operable on the first machine is communicated from the transportable memory to the first machine.

The subject invention also provides a second method for manufacturing an object. The method includes the steps of preparing a bill of materials for manufacturing the object from one of the materials listed and preparing a list of manufacturing operations necessary to manufacture the object. A computer program operable on a machine is associated with each manufacturing operation in a server computer. The method continues by storing identification data relating to the object in a transportable memory. The method progresses with the step of selecting one of the materials listed on the bill of materials necessary to manufacture the object. A link is established between the transportable memory and the selected material so that the transportable memory moves with the selected material. The method continues by moving the selected material and transportable memory to a first machine to manufacture the object. The method progresses with the steps of reading the identification data from the transportable memory to the first machine and sending the identification data from the first machine to the server computer. The computer program is then communicated from the server computer to the first machine.

The subject invention further provides a system for manufacturing an object. The system includes a database for storing a bill of materials and a list of manufacturing operations necessary to manufacture the object. A server computer is in communication with the database for associating a computer program with each manufacturing operation. A transportable memory is in communication with the server computer for storing each computer program. The transportable memory is operatively connected to a selected material selected from the bill of materials. The system also includes a transport mechanism for moving the selected material and the transportable memory in unison. A first machine receives the computer program and manufactures the object.

The subject invention also provides a third method for manufacturing an object. The method includes the step of preparing a bill of materials for manufacturing the object from one of the materials listed. The method also includes the step of preparing a list of manufacturing operations necessary to manufacture the object. The method continues by associating at least one command operable on a machine with each manufacturing operation. Next, the method progresses by storing each command in a transportable memory. The method also includes the step of selecting one of the materials listed on the bill of materials necessary to manufacture the object. A link is established between the transportable memory and the selected material so that the transportable memory moves with the selected material. The method continues by moving the selected material and transportable memory to a first machine where the at least one command operable on the first machine is communicated from the transportable memory to the first machine.

By communicating a unique computer program or commands to the machine for each object to be manufactured, the method provides a robust manufacturing system with maximum flexibility. Furthermore, machine downtime is reduced when introducing a new product by not having to reprogram pre-stored programs in the machine to accommodate the new product.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the FIGS., wherein like numerals indicate corresponding parts throughout the several views, a system 10 and method 100 for manufacturing an object are shown.

Figure 1:
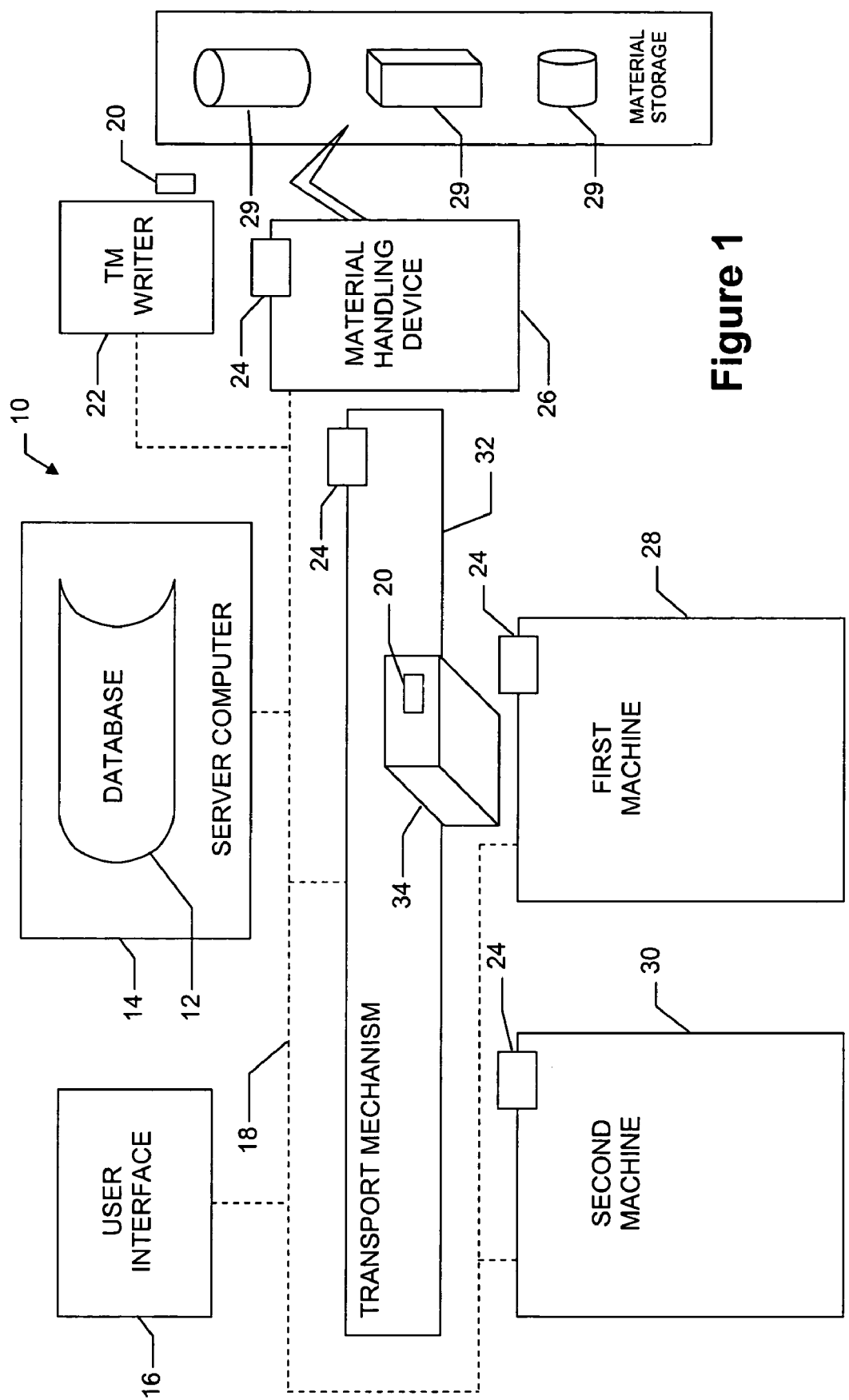
FIG. 1 is a block diagram showing a system for manufacturing an object.

As shown in FIG. 1, the system 10 includes a database 12 for storing information. This information includes, but is not limited to, a bill of materials necessary to manufacture the object and a list of manufacturing operations necessary to manufacture the object. A server computer 14 is in communication with the database 12. Preferably, the database 12 is located within the server computer 14; however, these could be separate units. A user interface 16 is in communication with the server computer 14. The user interface 16 may be a desktop or laptop PC, a personal digital assistant (PDA), a cellular phone, or other suitable device as known to those skilled in the art. A network 18 is preferably connected to the server computer 14 and the user interface 16 for allowing the communication between the server computer 14 and the user interface 16. The network 18 may be the Internet, a local area network (LAN), or a wide area network (WAN), etc., and may be implemented in a "hard-wired" or wireless configuration as is known to those skilled in the art.

The system 10 also includes at least one transportable memory 20. A transportable memory writer 22 writes data to the transportable memory 20 and a transportable memory reader 24 reads data from the transportable memory 20. The transportable memory writer 22 is in communication with the server computer 14 via the network.

In a first implementation, the transportable memory 20 is a radio frequency identification (RFID) tag. RFID tags are well known and each tag typically consists of a digital memory chip for storing data and an antenna operatively connected to the chip for reading and writing data to the chip. In the first implementation, the transportable memory readers and writers 24, 22 are implemented as RFID tag transceivers. RFID tag transceivers are able to read and write to the RFID tag without establishing physical contact with the RFID tag. Preferably, the RFID tag need only pass through the electromagnetic field generated by the RFID transceiver. An initial RFID transceiver is in communication with the database 12 for sending information from the database 12 to the RFID tag.

In a second implementation, the transportable memory 20 is a bar code. The bar code is preferably a two-dimensional bar code; however, other types of bar codes may be equally as acceptable. The transportable memory writer 22 is a bar code printer. The bar code printer is in communication with the database 12 for printing a bar code containing information from the database 12. The transportable memory reader 24 is a bar code reader. It is to be appreciated by those skilled in the art that other implementations of the transportable memory 20, transportable memory reader 24, and transportable memory writer 22 may be used with the subject invention.

A material handling device 26 is utilized to automatically select at least one of the materials 29 necessary to manufacture the object. The material handling device 26 may be implemented with a gantry, a robot, an automated storage and retrieval system (AS/RS), a self-guided vehicle (SGV), or other suitable device as are well known to those skilled in the art. Of course, more than one of the materials 29 necessary to manufacture the object may be selected at this time. The material handling device 26 may include a transportable memory reader 24 for reading information from the transportable memory 20. The material handling device 26 may also be in communication with the server computer 14 via the network 18 for receiving information from the server computer 14.

The system 10 includes at least one machine for manufacturing the object. Of course, typical manufacturing plants include a plurality of machines where each machine is generally suited for specific types of operations. For illustrative purposes only, these operations may include cutting material, drilling holes, tapping holes, molding, painting, inserting bolts, silk-screening, etc. For purposes of simplification only, the plurality of machines are shown on the figures and referred to herein as a first machine 28 and a second machine 30. Those skilled in the art realize the teachings related to the first machine 28 and the second machine 30 can be implemented with any number of machines.

The first and second machines 28, 30 may each include a transportable memory reader 24 for reading information from the transportable memory 20. The first and second machines 28, 30 may also be in communication with the server computer 14 via the network 18 for receiving information from the server computer 14.

The system 10 includes a transport mechanism 32 to move the material necessary to manufacture the object to the machines 28, 30 and between the machines 28, 30. The transport mechanism 32 may be implemented as a conveyor, a gantry, a robot, an SGV, or other mechanism for moving material as are well known to those skilled in the art. The transport mechanism 32 may include a transportable memory reader 24 for reading information from the transportable memory 20. The transport mechanism 32 may also be in communication with the server computer 14 via the network 18 for receiving information from the server computer 14.

Figure 2:
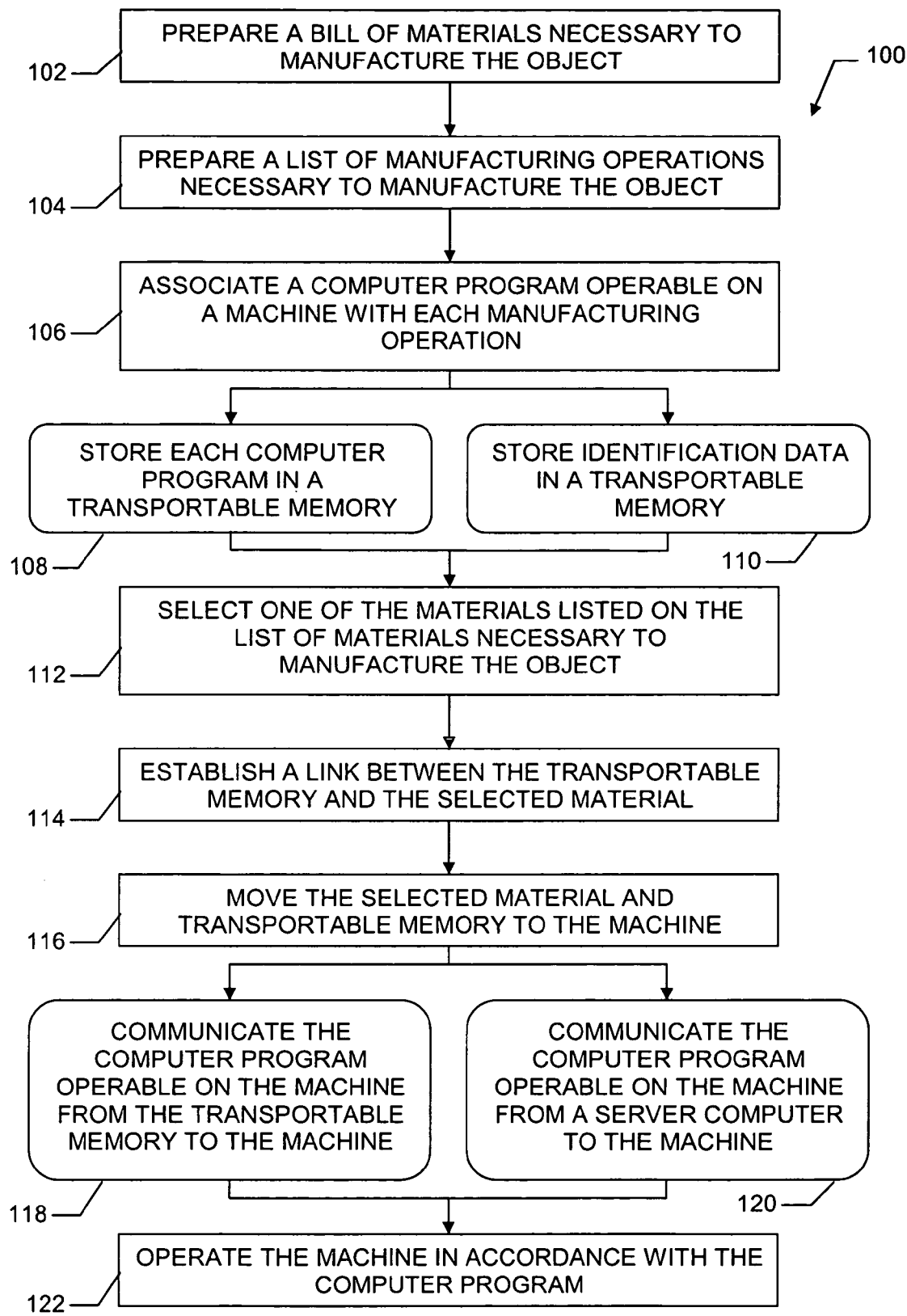
FIG. 2 is a flow chart showing steps of a first and second embodiment of a method of manufacturing the object.

Referring now to FIG. 2, a method begins with the step 102 of preparing the bill of materials from one of the materials 29 listed. The materials 29 are the physical items needed to produce the object. The bill of materials may include detailed information about the physical items, such as, but not limited to, quantity, size, shape, type, weight, quality, purity, stock number, and location.

The method continues with the step 104 of preparing the list of manufacturing operations necessary to manufacture the object. The list of manufacturing operations may include general or specific instructions for building the object. Those skilled in the art realize a wide variety of manufacturing operations that can be implemented. For illustrative purposes only, these operations may include such instructions as, "cut off 2 inches of stock", "drill a ½ inch hole to a depth of inch", "tap the ½ inch hole", "fill mold with green plastic", "paint red", "insert bolt into hole", "lay silkscreen mask on t-shirt", etc.

The lists are preferably stored in the database 12. The lists may be prepared well prior to the manufacturing of the object. A user may select a template for an object by utilizing the user interface 16. The template contains the bill of materials and list of manufacturing operations necessary to make the selected object. The user may also be offered the option to customize the object by choosing additional and/or alternative materials and/or manufacturing operations.

The method continues with the step 106 of associating a computer program operable on one of the machines 28, 30 with each manufacturing operation. The computer program is the actual machine code necessary to operate the machines 28, 30 which are each controlled by a processor (not shown). This computer machine code is dependent on the programming requirements of the processor. Numerous types of programming languages, ranging from high-level to low-level, are used in machines controlled by processors. Such languages include, but are not limited to, assembler, BASIC, ladder-logic, CNC instructions (G codes), C, sequential function charts (SFC), structured text, and Java.

It is possible that a particular manufacturing operation could be performed on more than one machine available in the manufacturing facility. The different machines may have different types of processors, and thus, different computer programs. Therefore, each manufacturing operation may be associated with a plurality of different computer programs.

In a first embodiment, the method includes the step 108 of storing each computer program in the transportable memory 20. In the first implementation, as stated earlier, the initial RFID transceiver is in communication with the database 12. The computer programs necessary to manufacture the object are communicated from the database 12, to the initial RFID transceiver, and to the RFID tag.

In a second embodiment, the method includes the step 110 of storing identification data in the transportable memory 20. The identification data is preferably a unique, numerical code that is different from all other codes in other transportable memories 20 used in the manufacturing facility. As with the first embodiment, the second embodiment may be implemented with the RFID tag, the bar code, or other suitable implementations as known to those skilled in the art.

In both the first and second embodiment, the method may also include the step of storing the identity of the machine 28, 30 or machines 28, 30 necessary to manufacture the object in the transportable memory 20. The proper sequence (or order) of machines 28, 30 necessary to manufacture the object may also be stored.

The step of storing the bill of materials in the transportable memory 20 may also be included in the method. By storing this data, the transportable memory 20 "knows" which machines 28, 30 and materials are necessary to properly manufacture the object. Additionally, as the object is manufactured, the transportable memory 20 may be updated to reflect which materials and operations have already been incorporated into the object.

The method continues with the step 112 of selecting one of the materials listed on the bill of materials necessary to manufacture the object. Preferably, the material handling device 26 is utilized to automatically select at least one of the materials 29 necessary to manufacture the object. Alternatively, the selecting of one of the materials 29 may be done by hand. Of course, more than one of the materials 29 necessary to manufacture the object may be selected at this time.

In the first embodiment, the material handling device 26 is in communication with the transportable memory 20. Accordingly, the material handling device 26 reads the bill of materials and selects the appropriate material 29 or materials 29. In the second embodiment, the material handling device 26 is in communication with the computer server. The material handling device 26 may read the transportable memory 20 to obtain the identification data stored within. In response, the server then provides the material handling device 26 with the material 29 or materials 29 which should be selected.

Instead of utilizing the material handling device 26, the material 29 or materials 29 may be selected by hand. Instructions specifying which material 29 to select may be displayed on a display (not shown) for manual selection by a worker.

The method continues with the step 114 of establishing a link (i.e., an operative connection) between the transportable memory 20 and the selected material 34. This link allows the transportable memory 20 to move along with the selected material 34. Said another way, the selected material 34 is moved in unison with the transportable memory 20. It is preferable that the transportable memory 20 is attached to the selected material 34 to reduce the risk of associating the transportable memory 20 with other nearby materials or machines. Of course, attaching the transportable memory 20 to the selected material 34 may not be practicable, especially when the selected material 34 is to be machined on all sides, subjected to extreme heat, etc. So alternatively, the transportable memory 20 may be attached to a pallet or tray (not shown) that carries the selected material 34 through the manufacturing environment. Those skilled in the art realize other suitable alternatives to ensure that a link exists between the transportable memory 20 and the selected material 34.

The method continues with the step 116 of moving the selected material 34 and transportable memory 20 to the first machine 28 to manufacture the object. Preferably, the transport mechanism 32 automatically moves the selected material 34. The transport mechanism 32 may receive instructions on where to move the selected material 34 from the transportable memory 20 or the server computer 14. Alternatively, the selected material 34 and transportable memory 20 may be moved by hand. Instructions on where to move the selected material 34 may be displayed on a display (not shown) for manual movement by a runner, forklift operator, etc.

Once the selected material 34 arrives at the first machine 28, the first embodiment of the method continues with the step 118 of communicating the computer program from the transportable memory 20 to the first machine 28. As the selected material 34 and the transportable memory 20 arrive at the first machine 28, the transportable memory reader 24 at the first machine 28 will read the information stored on the transportable memory 20. The information on the transportable memory 20 is then analyzed to determine what operations can or should take place by the first machine 28. If the transportable memory 20 contains a computer program that is operable on the first machine 28, that computer program is parsed from the other information. Thus, the computer program for the first machine 28 is retrieved without having to access the server computer 14 or database 12.

It is important to emphasize that, up until reading the computer program from the transportable memory 20, the first machine 28 is free of any stock programs for manufacturing objects. The first machine 28 is essentially "dumb" except for limited routines necessary to interface with the transportable memory 20. This setup gives the system 10 a wide degree of flexibility in its ability to manufacture a wide variety of objects. The manufacturing facility is not narrowly confined into a set number of programs that are pre-stored in the machines 28, 30. Furthermore, implementing a new line of objects for manufacture does not require the time consuming process of reprogramming machines 28, 30 having pre-stored programs or restrictive pre-defined manufacturing sequences.

It is also important to reemphasize that the computer programs stored in the transportable memory 20 are not mere "setpoints" that are transferred to the first machine 28 for use with a pre-stored program. The term "setpoints" refers to data intended to trigger a pre-stored program to operate, dimensional data, positional data, etc. Instead, the computer program, as used in the subject invention, is an entire set of machine code instructions needed to operate the first machine 28 to accomplish the desired manufacturing operation.

In the second embodiment, the identification data stored on the transportable memory 20 is communicated to the first machine 28. The first machine 28 communicates the identification data retrieved from the transportable memory 20 to the server computer 14. In response, the method continues with the step 120 of the server computer 14 communicating the computer program corresponding to the selected part and the transportable memory 20 to the first machine 28.

The method progresses with the step 122 of operating the first machine 28 in accordance with the computer program. Thus, the first machine 28 performs at least one of the manufacturing operations necessary to manufacture the object. The first machine 28 may add materials to the selected material 34 in order to further manufacture the object. For instance, a bolt feeder may add bolts, a painting robot may add a coat of paint, etc. The first machine 28 may communicate to the transportable memory 20 that the one (or more) of the materials from the bill of materials has been successfully integrated with the selected material 34. The first machine 28 may also communicate to the transportable memory 20 that the manufacturing operation has been completed.

After the first machine 28 completes its operation, the transport mechanism 32 refers to the sequence of machines necessary to manufacture the object. As previously mentioned, this sequence is stored on the server computer 14 and/or the transportable memory 20. Accordingly, the transport mechanism then moves the selected material 34 from the first machine 28 to the second machine 30.

Figure 3:
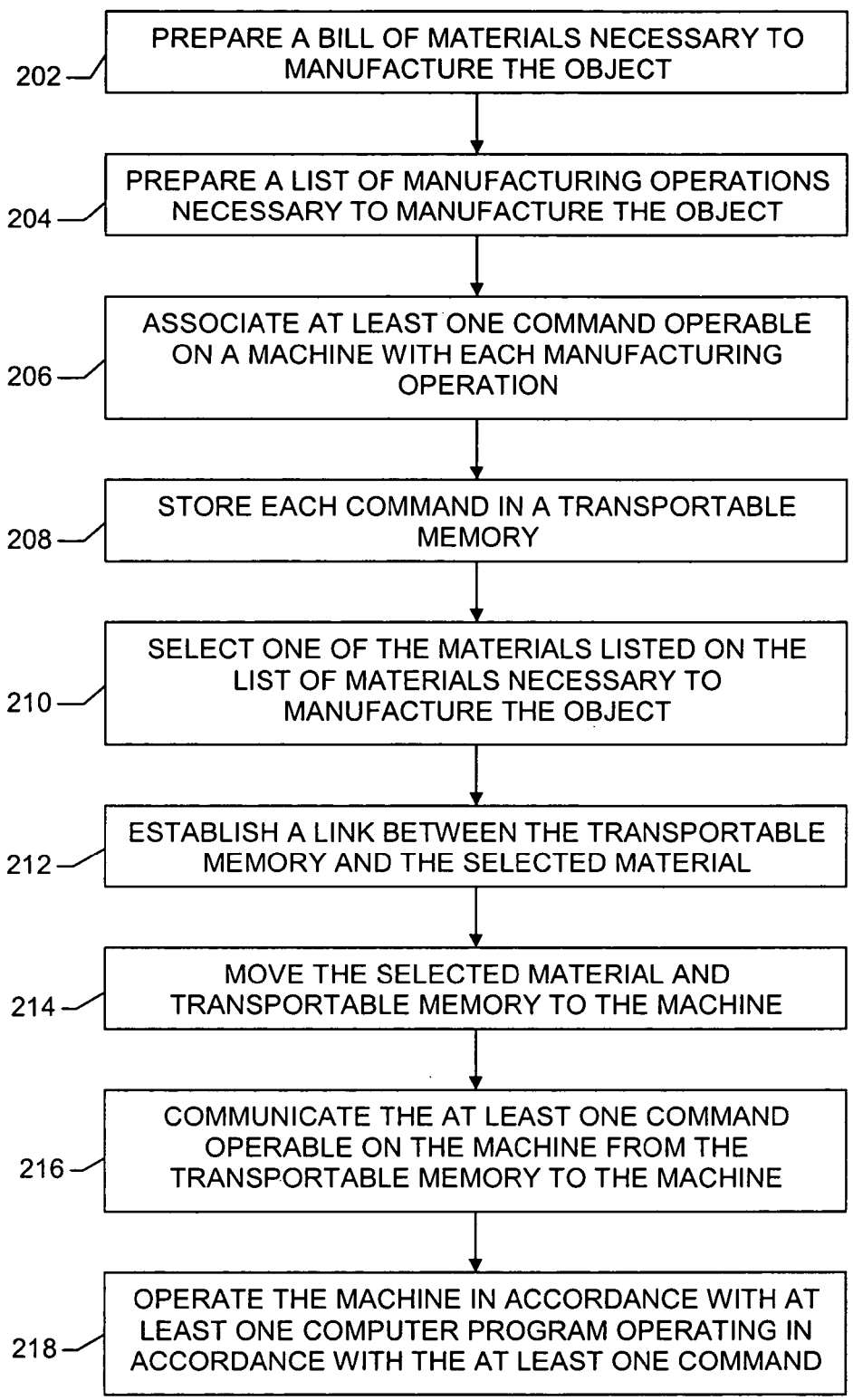
FIG. 3 is a flow chart showing steps of a third embodiment of a method of manufacturing the object.

The subject invention also provides a third embodiment of a method 200 for manufacturing an object. Referring now to FIG. 3, the method 200 includes the step 202 of preparing a bill of materials for manufacturing the object from one of the materials listed and the step 204 of preparing a list of manufacturing operations necessary to manufacture the object. Steps 202 and 204 are generally similar to steps 102 and 104, respectively, as described in greater detail above.

The method continues with the step 206 of associating at least one command with each manufacturing operation. The term "command" refers to an instruction more specific than a "manufacturing operation" but more general than a "computer program". For example, commands associated with the manufacturing operation "drill a ½ inch hole to a depth of inch" may include "activate clamps", "start drill motor", "move drill motor to ½ inch depth", "return drill motor back to home", "stop drill motor", and "deactivate clamps". Of course, these commands would be properly formatted such that they are understandable by the processors of the machines.

The method continues with the step 208 of storing each command in the transportable memory 20. Next, the step 210 of selecting one of the materials listed on the bill of materials necessary to manufacture the object is performed. The method continues with the step 212 of establishing a link between the transportable memory 20 and the selected material 34 so that the transportable memory 20 moves with the selected material 34. The selected material 34 and transportable memory 20 are moved to a first machine 28 in the next step 214. Steps 210, 212 and 214 are generally similar to steps 112, 114 and 116, respectively, as described in greater detail above.

The method continues with the step 216 of communicating the at least one command operable on the first machine 28 from the transportable memory 20 to the first machine 28. The first machine 28 is capable of parsing the commands received to act on only those commands that can and/or should be operated on the first machine 28.

In the third embodiment, the processor of the first machine 28 includes a plurality of computer programs. Each computer program is associated with a particular operation of the machine. For example, there may be a first computer program to control clamps (not shown), a second computer program to control a drill motor (not shown), and a third computer program to control a slide (not shown) which moves the drill. Each of the commands communicated to the first machine 28 corresponds to one these computer programs. The method then progresses with the step 218 of operating the first machine 28 in accordance with at least one computer program. The at least one computer program is operating in accordance with the at least one command.

It should be understood that the commands do not necessarily have to be performed by an automated machine. Instead, the transportable memory 20 may communicate the commands to a display (not shown). An operator may then perform the commands manually, thus furthering the manufacture of the object.

Obviously, many modifications and variations of the present invention are possible in light of the above teachings. The invention may be practiced otherwise than as specifically described within the scope of the appended claims.

What is claimed is:

1. A method for manufacturing an object comprising the steps of:
   preparing a bill of materials for manufacturing the object from one of the materials listed;
   preparing a list of manufacturing operations necessary to manufacture the object;
   associating a computer program operable on a machine with each manufacturing operation;
   storing each computer program in a transportable memory;
   selecting one of the materials listed on the bill of materials necessary to manufacture the object;
   establishing a link between the transportable memory and the selected material so that the transportable memory moves with the selected material;
   moving the selected material and transportable memory to a first machine; and
   communicating the computer program operable on the first machine from the transportable memory to the first machine.

2. A method as set forth in claim 1 further comprising the step of operating the first machine in accordance with the computer program to manufacture the object.

3. A method as set forth in claim 1 wherein said step of establishing a link between the transportable memory and the selected material is further defined as attaching the transportable memory to the selected material.

4. A method as set forth in claim 1 further comprising the step of moving the selected material and transportable memory to a second machine different from the first machine.

5. A method as set forth in claim 4 further comprising the step of communicating the computer program operable on the second machine from the transportable memory to the second machine.

6. A method as set forth in claim 1 further comprising the step of storing the bill of materials in the transportable memory.

7. A method as set forth in claim 1 further comprising the step of storing the identity and sequence of the machines necessary to manufacture the object in the transportable memory.

8. A method as set forth in claim 7 further comprising the step of communicating the identity and sequence of the machines necessary to manufacture the object from the transportable memory to a transport system.

9. A method for manufacturing an object comprising the steps of:
preparing a bill of materials for manufacturing the object from one of the materials listed;
preparing a list of manufacturing operations necessary to manufacture the object;
associating a computer program operable on a machine with each manufacturing operation in a server computer;
storing identification data relating to the object in a transportable memory;
selecting one of the materials listed on the bill of materials necessary to manufacture the object;
establishing a link between the transportable memory and the selected material so that the transportable memory moves with the selected material;
moving the selected material and transportable memory to a first machine to manufacture the object;
reading the identification data from the transportable memory to the first machine;
sending the identification data from the first machine to the server computer; and
communicating the computer program operable on the first machine from the server computer to the first machine.

10. A method as set forth in claim 9 further comprising the step of operating the first machine in accordance with the computer program.

11. A method as set forth in claim 9 wherein said step of establishing a connection between the transportable memory and the selected material is further defined as attaching the transportable memory to the selected material.

12. A method as set forth in claim 9 further comprising the step of moving the selected material and transportable memory from the first machine to a second machine.

13. A method as set forth in claim 9 further comprising the step of communicating the identity and sequence of the machines necessary to manufacture the object from the server computer to a transport mechanism.

14. A system for manufacturing an object composing:
a database for storing a bill of materials and a list of manufacturing operations necessary to manufacture the object;
a server computer in communication with said database for associating a computer program with each manufacturing operation;
a transportable memory in communication with said server computer for storing each computer program and operatively connected to a selected material selected from the bill of materials;
a transport mechanism for moving the selected material and the transportable memory in unison; and
a first machine for receiving the computer program and manufacturing the object.

15. A system as set forth in claim 14 further comprising a transportable memory writer in communication to said server computer and said transportable memory for receiving each computer program from said server computer and writing each computer program to said transportable memory.

16. A system as set forth in claim 14 further comprising a material handling device having a transportable memory reader for providing one of the materials necessary to manufacture the object in response to communication from said transportable memory.

17. A system as set forth in claim 14 wherein said transportable memory further stores an identity and sequence of machines necessary to manufacture the object and wherein said transport mechanism includes a transportable memory reader for reading the identity and sequence of machines from said transportable memory.

18. A system as set forth in claim 14 wherein said first machine includes a transportable memory reader for reading the computer program from the transportable memory.

19. A system as set forth in claim 14 further comprising a user interface in communication with said server computer for selecting a template of the object to be manufactured.

20. A method for manufacturing an object comprising the steps of:
preparing a bill of materials for manufacturing the object from one of the materials listed;
preparing a list of manufacturing operations necessary to manufacture the object;
associating at least one command with each manufacturing operation;
storing each command in a transportable memory;
selecting one of the materials listed on the bill of materials necessary to manufacture the object;
establishing a link between the transportable memory and the selected material so that the transportable memory moves with the selected material;
moving the selected material and transportable memory to a first machine; and
communicating the at least one command operable on the first machine from the transportable memory to the first machine.

21. A method as set forth in claim 20 further comprising the step of operating the first machine in accordance with at least one computer program operating in accordance with the at least one command.

* * * * *

UNITED STATES PATENT AND TRADEMARK OFFICE
CERTIFICATE OF CORRECTION

| | |
|---|---|
| PATENT NO. | : 7,379,779 B2 |
| APPLICATION NO. | : 11/096108 |
| DATED | : May 27, 2008 |
| INVENTOR(S) | : Gregg O. Ekberg |

It is certified that error appears in the above-identified patent and that said Letters Patent is hereby corrected as shown below:

Column 9, line 55, delete "composing" and replace with --comprising--.

Signed and Sealed this

Twenty-sixth Day of August, 2008

JON W. DUDAS
*Director of the United States Patent and Trademark Office*